United States Patent
Okawa et al.

(10) Patent No.: US 9,571,828 B2
(45) Date of Patent: Feb. 14, 2017

(54) IMAGE ENCODING APPARATUS, IMAGE ENCODING METHOD AND PROGRAM

(71) Applicant: CANON KABUSHIKI KAISHA, Tokyo (JP)

(72) Inventors: Koji Okawa, Kawasaki (JP); Saku Hiwatashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 13/725,874

(22) Filed: Dec. 21, 2012

(65) Prior Publication Data

US 2013/0170545 A1    Jul. 4, 2013

(30) Foreign Application Priority Data

Dec. 28, 2011    (JP) .................................. 2011-288684

(51) Int. Cl.

| | |
|---|---|
| *H04N 19/00* | (2014.01) |
| *H04N 19/124* | (2014.01) |
| *H04N 19/14* | (2014.01) |
| *H04N 19/154* | (2014.01) |
| *H04N 19/176* | (2014.01) |

(52) U.S. Cl.
CPC ........ *H04N 19/0009* (2013.01); *H04N 19/124* (2014.11); *H04N 19/154* (2014.11); *H04N 19/176* (2014.11); *H04N 19/14* (2014.11)

(58) Field of Classification Search
USPC ........................................................ 375/240
See application file for complete search history.

(56) References Cited

U.S. PATENT DOCUMENTS

| | | | | |
|---|---|---|---|---|
| 2004/0234144 | A1* | 11/2004 | Sugimoto ............ | H04N 19/176 382/239 |
| 2007/0274385 | A1* | 11/2007 | He ......................... | H04N 19/51 375/240.12 |
| 2009/0086816 | A1* | 4/2009 | Leontaris ............. | H04N 19/176 375/240.03 |
| 2009/0190660 | A1  | 7/2009 | Kusakabe et al. | |
| 2009/0323810 | A1* | 12/2009 | Liu ....................... | H04N 19/176 375/240.16 |
| 2010/0189183 | A1* | 7/2010 | Gu .................... | H04N 21/23439 375/240.28 |
| 2010/0316126 | A1* | 12/2010 | Chen .................... | H04N 19/124 375/240.16 |
| 2011/0075730 | A1* | 3/2011 | Samuelsson ......... | H04N 19/139 375/240.03 |

(Continued)

FOREIGN PATENT DOCUMENTS

| | | |
|---|---|---|
| CN | 1473436 A | 2/2004 |
| CN | 101184221 A | 5/2008 |

(Continued)

*Primary Examiner* — Reza Aghevli
(74) *Attorney, Agent, or Firm* — Canon U.S.A., Inc. IP Division

(57) ABSTRACT

An image encoding apparatus includes an encoding unit which encodes an input image of a block, a calculating unit which calculates a plurality of evaluation values for the block, an identifying unit which generates identification information by comparing a plurality of evaluation values calculated by the calculating unit with a plurality of threshold values, and a controller which controls a quantization parameter on the basis of the identification information identified by the identifying unit.

7 Claims, 11 Drawing Sheets

(56) References Cited

U.S. PATENT DOCUMENTS

| | | | | |
|---|---|---|---|---|
| 2011/0090960 A1* | 4/2011 | Leontaris | ............ | H04N 19/103 |
| | | | | 375/240.12 |
| 2011/0164677 A1* | 7/2011 | Lu | ........................ | H04N 19/176 |
| | | | | 375/240.02 |
| 2011/0170591 A1* | 7/2011 | Li | ........................ | H04N 19/105 |
| | | | | 375/240.01 |
| 2012/0269258 A1* | 10/2012 | Yang | ................ | H04N 19/00163 |
| | | | | 375/240.02 |
| 2013/0101039 A1* | 4/2013 | Florencio | ............ | H04N 19/176 |
| | | | | 375/240.16 |

FOREIGN PATENT DOCUMENTS

| | | | |
|---|---|---|---|
| CN | 101325711 | A | 12/2008 |
| JP | H04-051689 | A | 2/1992 |
| JP | H06-245199 | A | 9/1994 |
| JP | 9-018872 | A | 1/1997 |
| JP | H10-023430 | A | 1/1998 |

\* cited by examiner

FIG. 10

| REGION | CONDITION |
|---|---|
| R1 | S1 < T1[1] AND S2 < T2[1] |
| R2 | S1 < T1[2] AND S2 < T2[3] |
| R3 | S1 < T1[3] AND S2 < T2[1] |
| R4 | S1 < T1[4] AND S2 < T2[1] |
| R5 | S1 < T1[6] AND S2 < T2[1] |
| R6 | S1 < T1[6] AND S2 < T2[3] |
| R7 | S1 < T1[7] AND S2 < T2[4] |
| R8 | S1 < T1[5] AND S2 < T2[5] |
| R9 | S1 < T1[8] AND S2 < T2[6] |
| R10 | S1 < T1[8] AND S2 < T2[7] |
| R11 | S1 < T1[9] AND S2 < T2[6] |
| R12 | S1 < T1[9] AND S2 < T2[7] |
| R13 | S1 < T1[9] AND S2 < T2[8] |

IMAGE ENCODING APPARATUS, IMAGE ENCODING METHOD AND PROGRAM

BACKGROUND OF THE INVENTION

Field of the Invention

The present invention relates to image encoding apparatuses, image encoding methods and programs and particularly relates to adaptive rate control within a screen.

Description of the Related Art

H.264/MPEG-4 AVC (hereinafter, called H.264) has been known as an encoding method used for moving picture compression recording. (ITU-T H.264 (03/2010) Advanced video coding for generic audiovisual services) According to H.264, an image is encoded in blocks, but the quantization value is variable for each block. Controlling the quantization value to change the rate to be assigned to a block may allow image quality control. Japanese Patent Laid-Open No. 9-18872 is an example of technologies in the past of changing the rate to be assigned to a block. According to Japanese Patent Laid-Open No. 9-18872, evaluation values such as a luminance average value, color difference average value, luminance dispersion value, and motion vector rate average value of a block are multiplied to calculate the degree of difficulty of encoding of the block, and the rate is assigned to the block. In accordance with the assigned rate, the quantization value is controlled.

However, the control method according to Japanese Patent Laid-Open No. 9-18872 has a higher complexity of the calculation of the function for determining the quantization value, which may increase the cost as a result. The control method according to Japanese Patent Laid-Open No. 9-18872 is implemented on the premise that the relationship between an evaluation index linearly converted to one dimensional value and the quantization value is mathematized in advance by the multiplication of a plurality of evaluation values in advance. Therefore, it is diadvatageously difficult to nonlinearly identify a characteristic of a block to be encoded from various evaluation indices and thus adaptively implement detailed rate assignment in accordance with identification results.

SUMMARY OF THE INVENTION

An image encoding apparatus includes an encoding unit which encodes an input image of a block, a calculating unit which calculates a plurality of evaluation values for the block, an identifying unit which generates identification information by comparing a plurality of evaluation values calculated by the calculating unit with a plurality of threshold values, and a controller which controls a quantization parameter on the basis of the identification information identified by the identifying unit.

The present invention allows detailed control over quantization values according to a visual characteristic on the basis of a plurality of evaluation values, thus allowing enhancement of subjective image quality.

Further features of the present invention will become apparent from the following description of exemplary embodiments with reference to the attached drawings.

BRIEF DESCRIPTION OF THE DRAWINGS

FIG. 10 illustrates a relationship between areas and evaluation values according to a fifth embodiment.

DESCRIPTION OF THE EMBODIMENTS

First Embodiment

Figure 1:
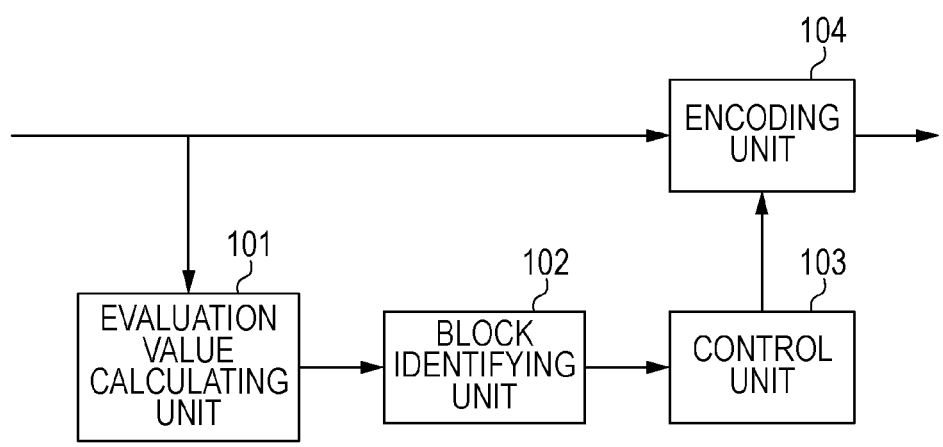
FIG. 1 is a block diagram illustrating an image encoding apparatus according to a first embodiment.

A first embodiment of the present invention will be described below with reference to drawings. FIG. 1 is a block diagram illustrating an image encoding apparatus according to this embodiment.

Referring to FIG. 1, an evaluation value calculating unit 101 calculates an evaluation value of an input image. The evaluation value calculating unit 101 receives input of an image of a block and calculates a plurality of evaluation values for the block. A block identifying unit 102 generates identification information on the basis of a plurality of evaluation values. A controller 103 determines a quantization parameter for the block on the basis on the identification information. An encoding unit 104 encodes the input image. The encoding unit 104 receives input of an image of a block, encodes the block on the basis of the quantization parameter generated by the controller and thus generates an encoded stream.

An operation of the image encoding apparatus of this embodiment will be described in detail with reference to the flowchart in FIG. 2. According to this embodiment, moving picture data is input in frames, is divided into blocks and is processed in raster order. However, the present invention is not limited thereto, but an image may be input in slices as a result of division of a frame, for example. The size of each of the blocks according to this embodiment is 16×16 pixels, but the present invention is not limited thereto. For example, it may be 8×8 pixels or 32×32 pixels, or it may be asymmetrical block of 32×16 pixels.

In step S201, the evaluation value calculating unit 101 calculates a plurality of evaluation values for an input block. It is assumed that the evaluation values relate to image quality indices when a subject block is encoded. For example, an image quality index refers to the degree of the influence on a human vision of the quantization error occurring when a block is encoded, and an evaluation value is calculated for determining the degree. According to this embodiment, the average value of luminances of pixels belonging to a block and the complexity of the luminances are calculated as the evaluation values. The luminance complexity here applies a total value of the magnitude (absolute value) of the difference between the luminance values of the pixels belonging to a block and the average luminance value of the block. However, the image encoding apparatus of the present invention is not limited thereto, but an index which allows the determination of the degree of the influence on a human vision may only be required. For example, an activity and/or distribution of a luminance may be calculated as evaluation values, or an activity, average value, complexity, and/or distribution of a color difference may be calculation. The number of evaluation values to be calculated is not limited to two types, but the average value of other evaluation values of a color difference may be calculated in addition to the average value and complexity of the luminance. The term, "activity" here refers to an index to be determined by acquiring the dispersion values of pixel values of sub-blocks resulting from further division of a block and selecting the lowest value of the acquired plurality of dispersion values.

In step S202, the block identifying unit 102 generates identification information on the block on the basis of the evaluation values. The identification information generation method will be described in detail below.

In step S203, the controller 103 generates a quantization parameter corresponding to an attribute of the block on the basis of the identification information. The details of the quantization parameter generation method are not limited particularly. However, a method is available which returns a quantization value corresponding to the identification result of a block in one to one manner through a table look-up processing, for example.

In step S204, the encoding unit 104 encodes the block on the basis of the quantization parameter to generate an encoded stream.

In step S205, whether all blocks within the frame have been encoded or not is determined. If all blocks have been encoded (Yes in step S205), the frame encoding processing ends. If all blocks have not been encoded (No in step S205), the processing moves to step S201 where a subsequent block is encoded.

Figure 7:
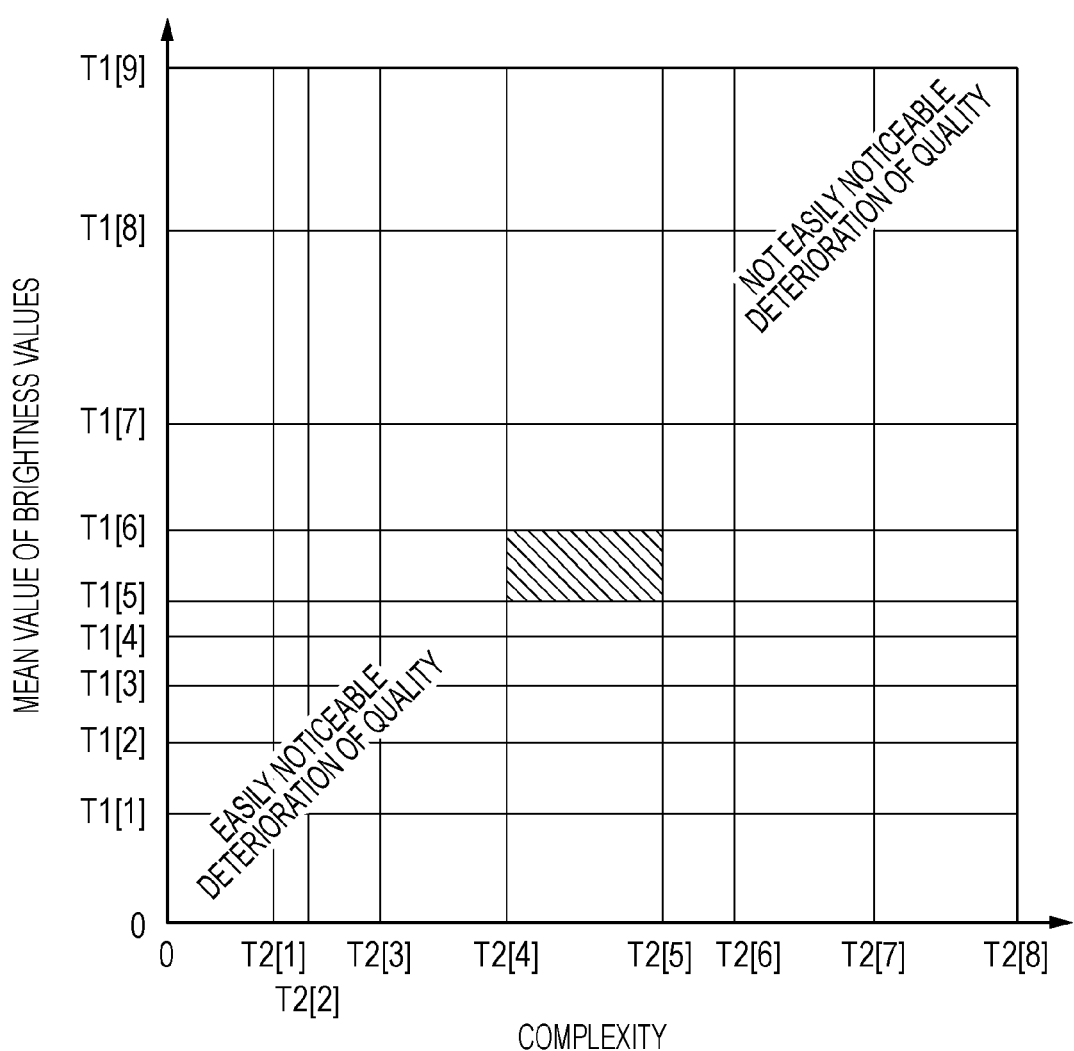
FIG. 7 illustrates identification of a block according to the first embodiment.

Next, there will be described a method of generating identification information on a block (step S202) according to this embodiment. According to this embodiment, two evaluation values of luminance average value S1 and luminance complexity S2 of a block are used. Threshold value sequences T1 and T2 are defined for evaluation values S1 and S2, respectively. A threshold value sequence Tn is held for a set of n evaluation values S1, S2, . . . , and Sn. FIG. 7 illustrates an example of identification of a block when a luminance average value and complexity are used as evaluation values. The horizontal axis indicates a complexity S2, and the vertical axis indicates a luminance average value S1, and the block is divided into a total of 72 areas. Each of T1 and T2 includes a set of threshold values that define the corresponding area. In the example in FIG. 7, T1={T1[1], T1[2], T1[3], T1[4], T1[5], T1[6], T1[7], T1[8], T1[9]}, and T2={T2[1], T2[2], T2[3], T2[4], T2[5], T2[6], T2[7], T2[8]}. Identification information M is a set of threshold values that define an area where the block positions among the evaluation values. For example, the shaded area in FIG. 7 has M={T1[6], T2[5]}.

Figure 3:
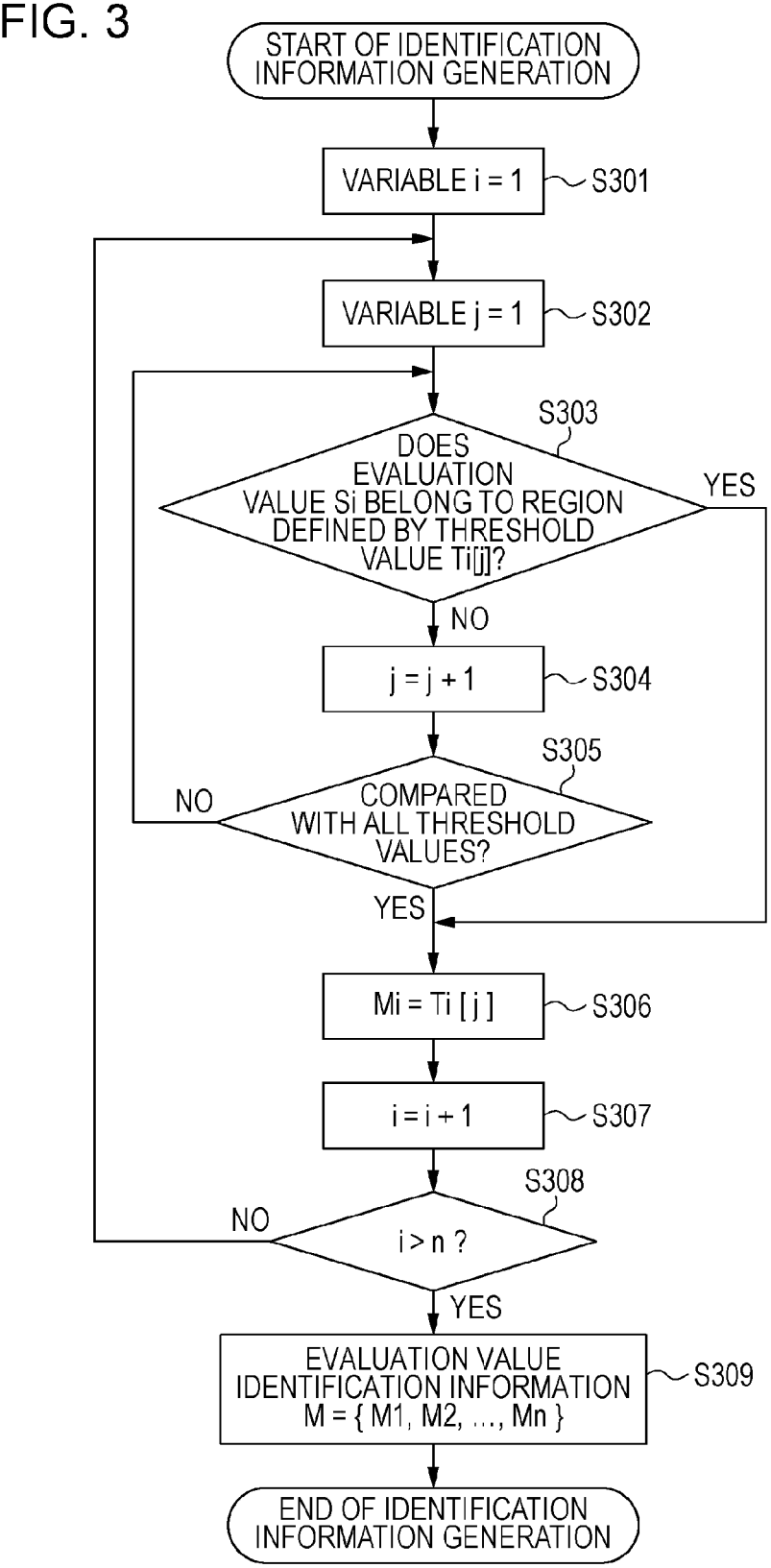
FIG. 3 is a flowchart of identification information generation according to the first embodiment.

The identification information generation method (step S202) will be described in detail with reference to the flowchart in FIG. 3. In step S301 first, a variable i is initialized to 1. In step S302, a variable j is initialized to 1. Next, in step S303, whether an evaluation value Si belongs to the inside of the area defined by a threshold value Ti[j] or not is determined. If the evaluation value Si belongs to the threshold value Tn[i] (Yes in step S303), the processing moves to step S306. If not, the processing moves to step S304. Next, in step S304, 1 is added to the variable j.

In step S305 next, whether the evaluation value Si has been compared with all threshold values (all threshold values belonging to the threshold value sequence Ti) or not is determined. If it has been compared with the all threshold values (Yes in step S305), the processing moves to step S306. If not, the processing moves to step S303. In step S306, a threshold value determined as belonging to the evaluation value Si is substituted into identification information Mi (the ith element of the identification information M) in the evaluation value Si, and thee processing moves to step S307. In step S307, 1 is added to the variable i, the processing moves to step S308. In step S308, whether the variable i is higher than n, that is, all of n evaluation values have been compared with the threshold value or not is determined. If all of them have been compared (Yes in step S308), the processing moves to step S309. If not (No in step S308), the processing moves to step S302.

In step S309, a set of threshold values determined as belonging to the evaluation value is substituted into the identification information M, and the identification information generation ends. The thus generated identification information indicates the part of the lattice area in FIG. 7 where the block positions. A characteristic of the block and a quantization value suitable for the characteristic are associated with the identification information for image quality control.

According to this embodiment, the identification information generation is performed in order to determine the degree of deterioration of image quality of the subject block. For example, the human eyes are sensitive to the deterioration of image quality more on an image of a low spatial frequency than an image of a high spatial frequency. For that, a block having a low complexity as described above has a low spatial frequency, and the deterioration of image quality due to a quantization error is more easily noticeable to the human vision. On the other hand, a block having a high complexity has a high spatial frequency, and the deterioration of image quality is not easily noticeable. The same is true for the luminance average value. The deterioration of image quality of a dark area is easily noticeable to the human vision, and the deterioration of image quality of a bright area is not easily noticeable. On the basis of those plurality of evaluation values and because the deterioration of image quality of the lower left area of FIG. 7, for example, is easily noticeable, the quantization value is reduced to suppress the deterioration of image quality. At the same time, the quantization value of the upper right area in FIG. 7 where the deterioration of image quality is not easily noticeable is increased to suppress the increase of the entire rate. This may keep the equivalent bit rate and also improve the subjective image quality.

According to this embodiment, two types of evaluation values of a luminance average value and complexity are used to set the quantization parameter on the basis of the position information on the two-dimensional space. However, it is self-evident that the number of types of evaluation value may be increased to N types (N>2) to extend to an N-dimensional space.

Second Embodiment

Figure 8:
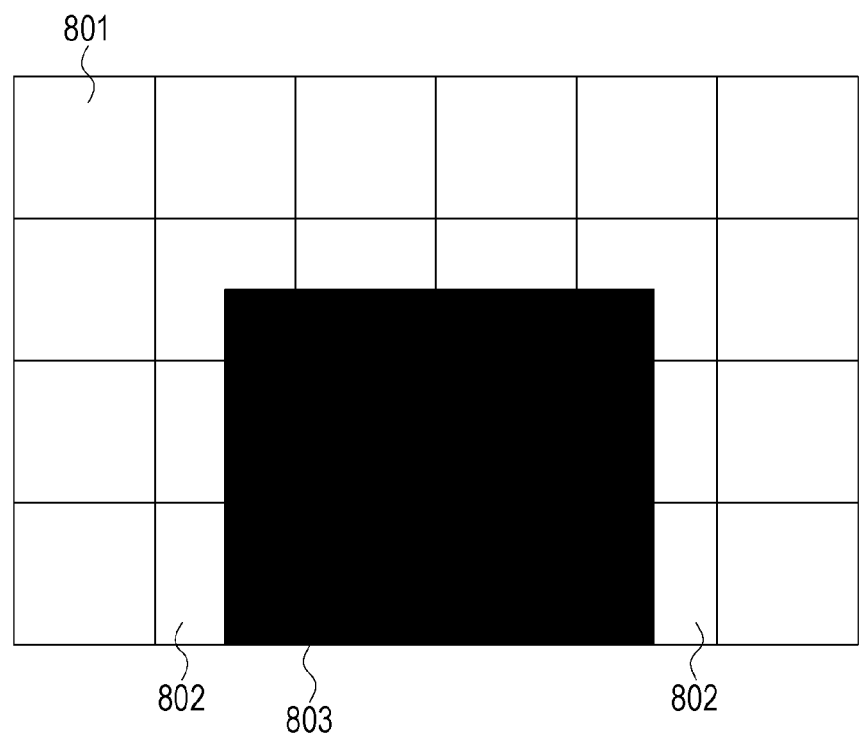
FIG. 8 illustrates a relationship between an object and blocks.

An image encoding apparatus of a second embodiment according to the present invention will be described. The configuration of an image encoding apparatus of this embodiment is the same as the configuration of the image encoding apparatus of the first embodiment illustrated in FIG. 1. The operation of the image encoding apparatus of this embodiment is also the same as that of the first embodiment illustrated in the flowchart in FIG. 2. The identification information generation method (step S202) illustrated in the flowchart in FIG. 3 is the same as that of the first embodiment. Therefore, the description will be omitted. According to this embodiment, the quantization parameter generation method (step S203) is different from that of the first embodiment in that not only block identification information but also the complexity of an adjacent block are used to determine the quantization parameter with high accuracy. With reference to FIG. 8, the effect of the use of the complexity of an adjacent block will be described.

FIG. 8 illustrates an image having a black object in a white background. Each of the squares represents a 16×16 pixel block. A block (white block) 801 is a part of the white background, and because all of the pixel values of the pixels belonging to the block are high, the complexity of the block is low. A block (black block) 803 is a part of the black object, and because all of the pixel values of the pixels belonging to the block are low, the complexity of the block is low. A block 802 positions on the boundary between the white blocks and the black blocks. The block 802 contains a mix of black pixels and white pixels. Because the difference value between the average value of the luminances of the blocks and the luminances of the pixels is large and the complexity is high, the block 802 belongs to an area for which the quantization parameter is set high in the example in FIG. 7. However, a block positioned at a boundary, like the block 802, generally exhibits easily-noticeable deterioration of image quality. Therefore, the quantization parameter is desirably set low. Because the block 801 and block 803 adjacent to the block 802 have a low complexity as described above, the difference value in complexity between the block 801 and block 803 and the block 802 is large. In this way, with reference to the complexities of the adjacent blocks, whether a given block is a boundary block having easily-noticeable deterioration of image quality or not may be determined, allowing setting a higher quantization parameter for it to prevent the deterioration of image quality.

Figure 4:
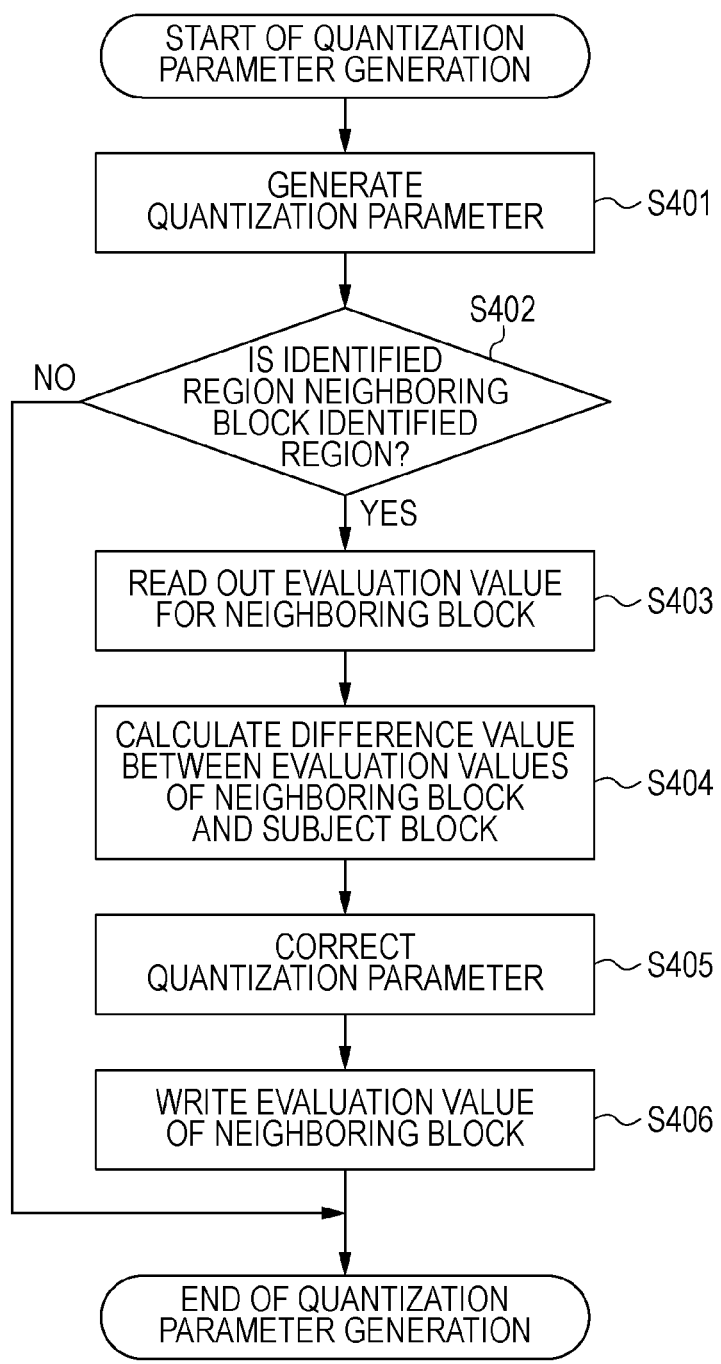
FIG. 4 is a flowchart of quantization parameter generation according to a second embodiment.

The quantization parameter generation method (step S203) will be described in detail with reference to the flowchart in FIG. 4.

Figure 2:
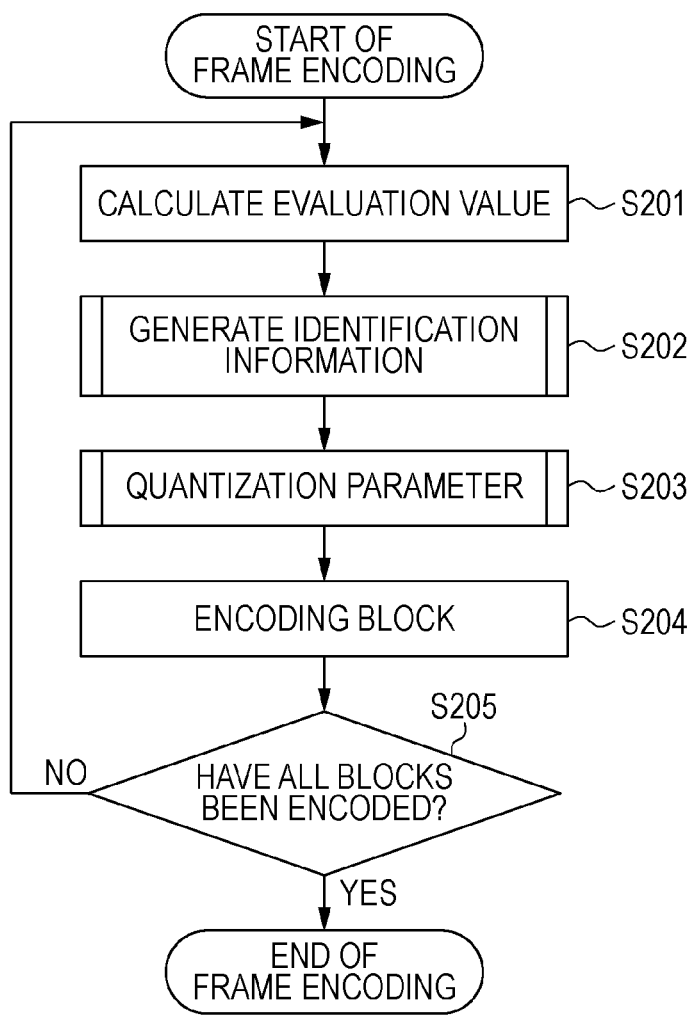
FIG. 2 is a flowchart for frame encoding according to the first embodiment.

First in step S401, the controller 103 determines a quantization parameter with reference to a table on the basis of the identification information M acquired by the processing in step S202 in FIG. 2. Next, in step S402, the controller 103 determines whether the area described by the identification information is an adjacent-block determination area or not. The adjacent-block determination area refers to an area for correcting the quantization parameter by using an evaluation value of an adjacent block when the quantization parameter is set. In order to prevent setting higher by mistake the quantization parameter for a block having easily-noticeable deterioration of subjective image quality, the quantization parameter is determine with high accuracy for the area for which the quantization parameter is set higher with reference to the parameter of an adjacent block. If it is an adjacent-block determination area, (Yes in step S402), the processing moves to step S403. If not, the quantization parameter generation ends.

In Next, step S403, the controller 103 reads an evaluation value of the adjacent block buffered in the processing in step S405, which will be described below. Next, in step S404, the difference value between the evaluation values of the adjacent block and the subject block is calculated. Next, in step S404, the controller 103 corrects the quantization parameter on the basis of the difference value.

According to this embodiment, the complexity of an adjacent block is read, and the difference value is extracted. If the difference value between the blocks is higher than a predetermined threshold value, the quantization parameter is set lower for a block where the complexity shifts from high to low than the adjacent block. This is because the block where the complexity shifts is highly possibly a boundary block of an object as described above, and therefore the deterioration of image quality is easily noticeable at a boundary of an object. Next, in step S405, the evaluation value of the subject block is buffered.

According to this embodiment, through this processing, whether the subject block is a boundary block where the deterioration of image quality is easily noticeable or not may be determined. Thus, setting the quantization parameter higher may prevent the deterioration of image quality.

Third Embodiment

Figure 5:
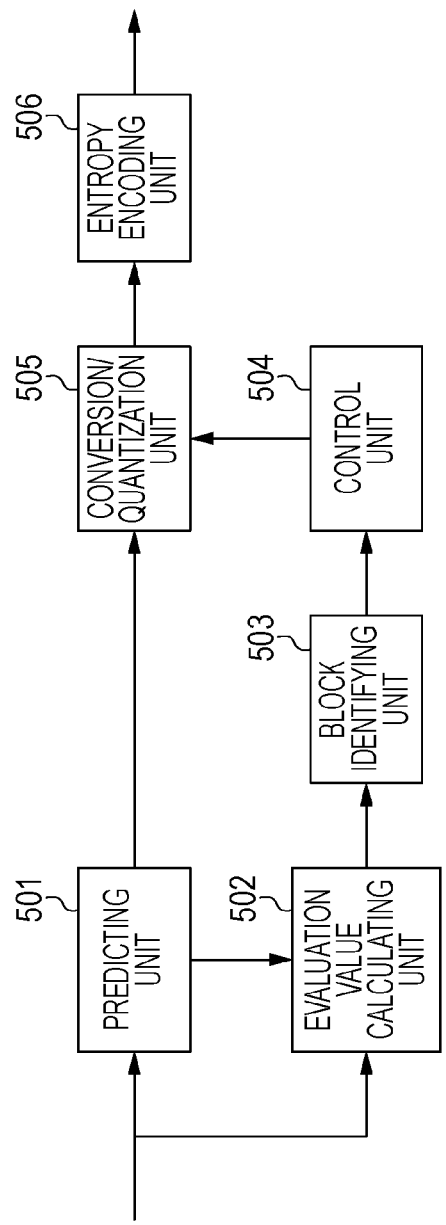
FIG. 5 is a block diagram illustrating a configuration of an image encoding apparatus according to a third embodiment.

An image encoding apparatus according to a third embodiment will be described. This embodiment uses three evaluation values of prediction information in addition to a luminance average value, a luminance complexity of a block. The term, "prediction information", refers to data for prediction encoding such as motion vector information, and adjacent pixel value information in H.264 encoding method. FIG. 5 is a block diagram illustrating a configuration of an image encoding apparatus of this embodiment.

Referring to FIG. 5, a predicting unit 501 performs prediction processing for prediction encoding on the basis of an input image, and an evaluation value calculating unit 502 calculates an evaluation value of an input image. The evaluation value calculating unit 502 receives the input of an image of a block, calculates a plurality of evaluation values of the block and calculates prediction information associated with a result of the prediction processing from the predicting unit 501. According to this embodiment, the magnitude of a motion vector is applied as the information acquired from the predicting unit 501. However, the present invention is not limited thereto. A block identifying unit 503 identifies the block on the basis of a plurality of the evaluation values. A controller 504 determines the quantization parameter for a block on the basis of the identification information. A conversion/quantization unit 505 performs frequency conversion processing on pixel data within a block and then quantizes on the basis of the quantization parameter determined by the controller. An entropy encoding unit 506 performs entropy encoding on the quantized data acquired in the conversion/quantization unit 505 to generate an encoded stream.

An operation on the image encoding apparatus of this embodiment will be described in detail with reference to the flowchart in FIG. 2. First in step S201, the evaluation value calculating unit 101 calculates a plurality of evaluation values for an input block. According to this embodiment, the magnitude of a motion vector (absolute value) acquired by the predicting unit 501 is used in addition to the evaluation values of the first embodiment.

Next, the identification information generation method (step S202) will be described in detail with reference to the flowchart in FIG. 3. Because the descriptions on step S301 and step S302 are the same as those of the first embodiment, the descriptions will be omitted. Next, in step S303, the block identifying unit 503 determines whether an evaluation value Si belongs to the area defined by a threshold value Ti[j] or not is determined. According to this embodiment, an evaluation value S1 is a luminance average value and an evaluation value S2 is a luminance complexity, as in the first embodiment, and an evaluation value S3 is the magnitude of a motion vector. A threshold value sequence Tn holds T1, T2, T3 corresponding to the evaluation value S1, S2, S3, respectively, as in the first embodiment. If the evaluation value Si belongs to a threshold value Tn[i] (Yes in step S303), the processing moves to step S306. If the evaluation value Si does not belong to the threshold value Tn[i], the processing moves to step S304. Because step S304, step S305, step S306, step S307, step S308, and step S309 are the same as those in the first embodiment, the description will be omitted. Because the processing in FIG. 2 is the same as that in the second embodiment, the description will be omitted.

The identification information generation in this embodiment is performed for determining the degree of deterioration of image quality of a subject block. Because the descriptions on the complexity and luminance average value are the same as those in the first embodiment, the descriptions will be omitted. This embodiment uses the fact that the human eyes may not follow well an area with a higher motion vector absolute value, that is, where an object is moving largely and the deterioration of image quality is not easily identifiable. On the basis of the plurality of evaluation values, the quantization value of an area where the deterioration of image quality is easily noticeable is reduced to suppress the deterioration of image quality. At the same time, the quantization value of the area where the deterioration of image quality is not easily noticeable is increased to suppress the increase of the entire rate. This may keep the equivalent bit rate and also improve the subjective image quality.

Fourth Embodiment

Figure 6:
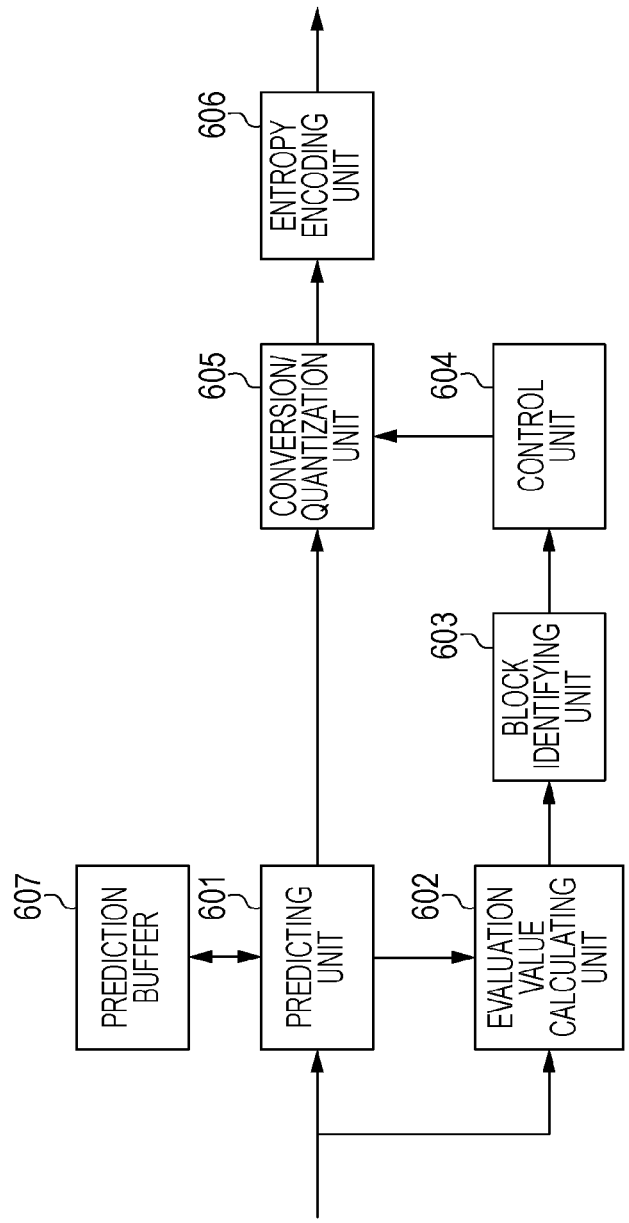
FIG. 6 is a block diagram illustrating a configuration of an image encoding apparatus according to a fourth embodiment.

An image encoding apparatus according to a fourth embodiment will be described. FIG. 6 is a block diagram illustrating a configuration of an image encoding apparatus of this embodiment.

Referring to FIG. 6, a predicting unit 601 generates a prediction error by performing prediction processing for prediction encoding on the basis of an input image. A prediction buffer 607 is connected thereto. The prediction buffer 607 stores prediction information on a block immediately before prediction processing is required and a block one column above. An evaluation value calculating unit 602 calculates an evaluation value of an input image. The evaluation value calculating unit 602 receives the input of an image of a block, calculates a plurality of evaluation values for the block, and calculates the evaluation value associated with the result of the prediction processing from the predicting unit 601. A block identifying unit 603 identifies the block on the basis of a plurality of the evaluation values. A controller 604 determines the quantization parameter for the block on the basis of the identification information. A conversion/quantization unit 605 performs frequency conversion processing on a prediction error generated by the predicting unit 601 and then quantizes on the basis of the quantization parameter determined by the controller. An entropy encoding unit 606 performs entropy encoding on data after the quantization that is acquired from the conversion/quantization unit 605 to generate an encoded stream.

Because the operation, identification information generation method (step S202 in FIG. 2) and quantization parameter generation method (step S203 in FIG. 2) of the image encoding apparatus of this embodiment are the same as those of the third embodiment, the descriptions will be omitted.

Like the second embodiment, in order to perform image quality control using identification information on a subject block and an adjacent block, the identification result on the block identified in the past or the evaluation values of the blocks may be required to buffer directly. When blocks are processed in raster order, the information for one block line may be required to hold to use information on an adjacent block above a subject block, for example. This requires a special memory for it, which therefore increases the cost. According to this embodiment, an interframe buffer memory (prediction buffer 607) that is not used for intraframe encoding is used for intraframe encoding. As a result, without a separate memory for storing block information, highly accurate image quality control even in consideration of a characteristic of an adjacent block for intraframe encoding with a relatively high bit rate and a high image quality control effect.

In order to perform interscreen encoding, an interframe buffer memory may store at least one of a motion vector and a prediction error. In order to perform intrascreen encoding, the interframe buffer memory may store at least one of an average value, an activity, a complexity, and a distribution.

Fifth Embodiment

Figure 9:
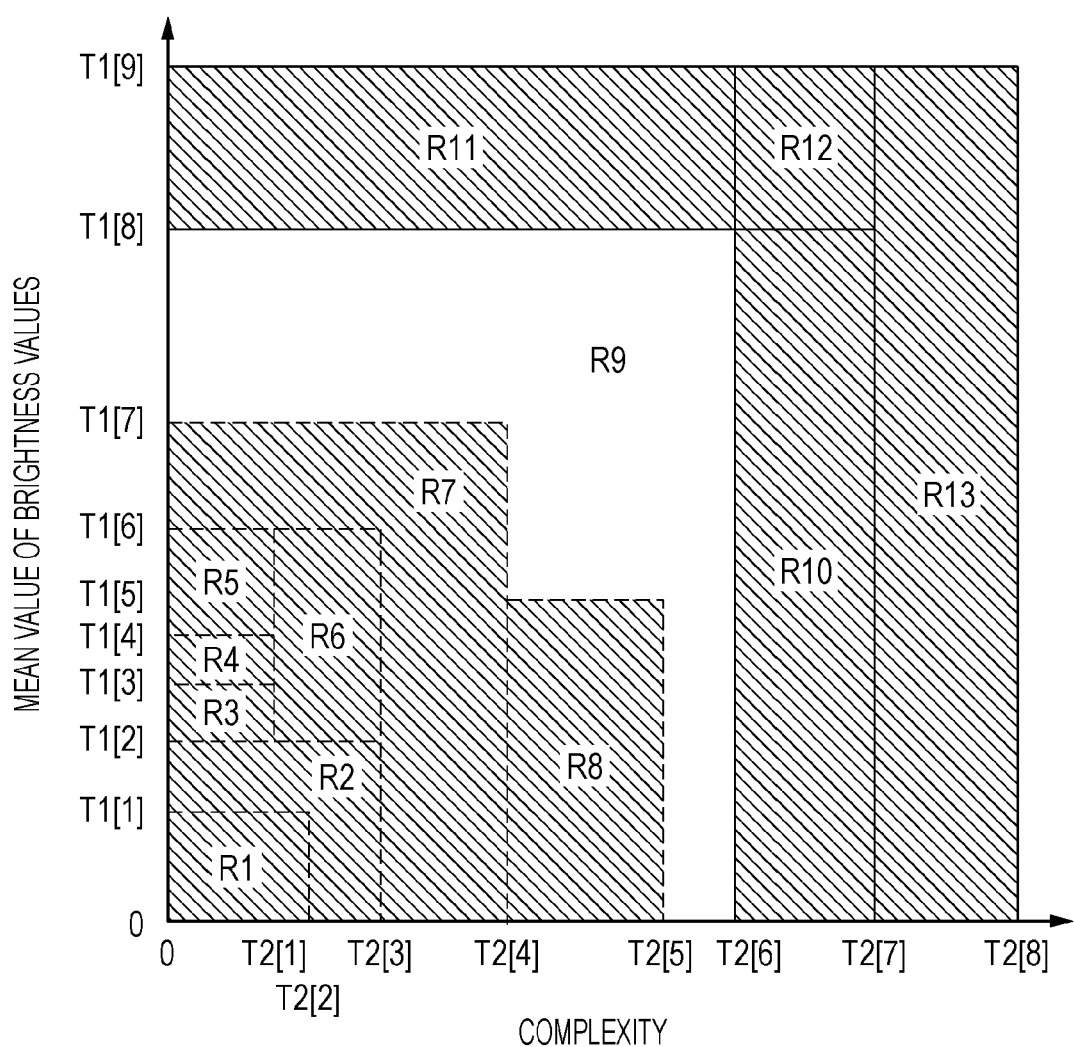
FIG. 9 illustrates identification of a block according to the first embodiment.

An image encoding apparatus of a fifth embodiment according to the present invention will be described. The configuration of the image encoding apparatus of this embodiment is the same as the configuration of the image encoding apparatus of the first embodiment according to the present invention illustrated in FIG. 1. Because the operation of the image encoding apparatus of this embodiment is also the same as that of the first embodiment illustrated in the flowchart in FIG. 2, the description will be omitted. According to this embodiment, the evaluation values S1 and S2 and the corresponding threshold value sequences T1 and T2 are also the same as those of the first embodiment. However, as illustrated in FIG. 9, this embodiment is different from the first embodiment in that the number of areas that are an identification results of blocks indicated by solid lines or broken lines is not 72 but 13 {R1, R2, . . . , R13}. In other words, a plurality of areas of the first embodiment are merged.

For the areas illustrated in FIG. 9, the quantization parameters may be changed differently in the processing in step S204 in FIG. 2. In the shaded areas, the weights on the quantization parameters are changed from a reference value. In the unshaved area (R9), the quantization parameter is not changed from the reference value. The term, "reference value" here refers to a default quantization parameter given to a frame. The areas surrounded by solid lines in the shaded areas are areas with a high complexity or a bright area. Because the deterioration of image quality in these areas is not easily noticeable, the quantization parameter may be set higher than the reference value to reduce the rate. On the other hand, the areas surrounded by broken lines are an area in which the deterioration of image quality is easily noticeable. Therefore, the quantization parameter is set lower than the reference value to improve the image quality. For detail control over the image quality, the areas in which the deterioration of image quality is easily noticeable are particularly divided finely. The identity of a block is determined simply through the comparison with a threshold value, which often allows simpler processing than the first embodiment. More specifically, while 72 comparison processes at a maximum are required for identifying 72 areas in the first embodiment, 13 comparison processes at a maximum are required for identifying 13 areas through the identification of areas in order of R1, R2, . . . , and R13, as illustrated in FIG. 10. According to this embodiment, the 13 divided areas are provided, for example. However, the present invention is not limited thereto. The number of divided areas may be increased for finer control over image quality.

Sixth Embodiment

The processing areas illustrated in FIG. 1, FIG. 5, and FIG. 6 are implemented by hardware according to the aforementioned embodiments. However, the processing to be implemented in the processing areas illustrated in FIG. 1, FIG. 5, and FIG. 6 may be implemented by a computer program.

Figure 11:
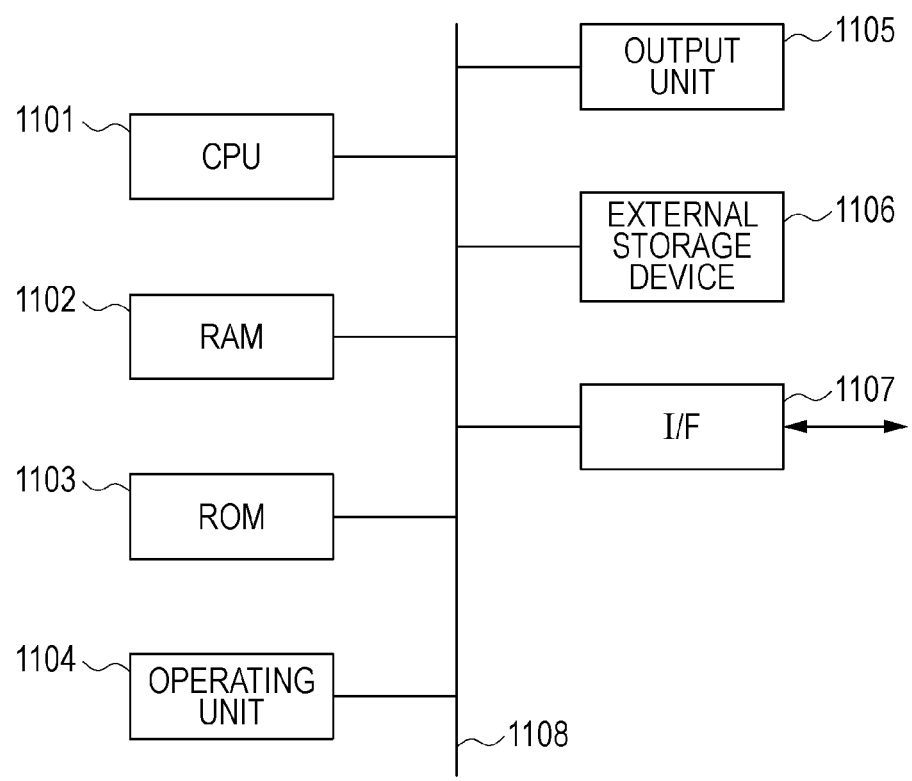
FIG. 11 is a block diagram illustrating a computer hardware configuration example that is applicable to an image encoding apparatus of the present invention.

FIG. 11 is a block diagram illustrating a computer hardware configuration example that is applicable to a display according to any one of the aforementioned embodiment.

A CPU 1101 entirely controls over a computer by using a computer program and/or data stored in a RAM 1102 and/or a ROM 1103 and executes the processes which have been described above as those to be executed by the image processing apparatus according to the aforementioned embodiments. In other words, the CPU 1101 may function as processing areas illustrated in FIG. 1, FIG. 5, and FIG. 6.

The RAM 1102 has an area for temporarily storing computer program and/or data loaded from an external storage 1106 and/or data externally acquired through an I/F (interface) 1107. The RAM 1102 has a work area to be used by the CPU 1101 for executing the processes. In other words, the RAM 1102 may be assigned as a frame memory, for example, or may provide other areas as required.

A ROM 1103 stores setting data and/or a boot program for the computer. An operating unit 1104 includes a keyboard and/or a mouse, for example, and may be operated by a user of the computer to input an instruction to the CPU 1101. A main display 1105 displays a processing result by the CPU 1101. The main display 1105 may include a display apparatus such as a liquid crystal display.

The external storage 1106 is a large capacity information storage device such as a hard disk drive. The external storage 1106 stores an operating system (OS) and/or a computer program for causing the CPU 1101 to implement the functions illustrated in FIG. 1, FIG. 5, and FIG. 6. The external storage 1106 may store image data to be processed.

The computer program or programs and/or data stored in the external storage 1106 is loaded to the RAM 1102 under the control of the CPU 1101 as required and is to be processed by the CPU 1101. To the I/F 1107, a network such as a LAN and the Internet and other apparatuses such as a projector and a display apparatus may be connected. The computer may acquire and send various information through the I/F 1107. A bus 1108 connects these components.

The operations by those components are centrally controlled by the CPU 1101 in accordance with the flowcharts for the aforementioned operations.

Other Embodiments

According to the present invention, a storage medium recording code of computer programs that execute the aforementioned functions may be supplied to a system, and the system may read and execute the code of the computer programs. In this case, the code of the computer programs read from the storage medium directly implements the functions of the aforementioned embodiments, and the storage medium storing the code of the computer programs is included in the present invention. The present invention includes cases where an operating system (OS) running on the computer performs a part or all of actual processing on the basis of an instruction from the program code and the processing implements the aforementioned functions.

The present invention may be implemented as follows. That is, computer program code read from a storage medium may be written to a function extension card inserted to a computer or a memory provided in a function extension unit connected to a computer. On the basis of an instruction from the computer program code, a CPU, for example, provided in the function extension card or function extension unit executes a part or all of actual processing to implement the aforementioned functions.

When the present invention is applied to the storage medium, the storage medium stores the computer program code corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-288684 filed Dec. 28, 2011, which is hereby incorporated by reference herein in its entirety.

What is claimed is:

1. An image encoding apparatus comprising:
an encoder configured to encode blocks in an input image;
a calculator configured to calculate a plurality of evaluation values for the block, the plurality of evaluation values including at least a first evaluation value and a second evaluation value,
wherein the first evaluation value is an average value of luminance values belonging to the block, and the second evaluation value is one of an activity of the block, a distribution of the block, and a total value of a magnitude of a difference between the luminance values belonging to the block and the average value; and
a controller configured to:
determine a quantization parameter for quantization processing on the block in accordance with results of comparison of the plurality of evaluation values including at least the first and second evaluation values calculated by the calculator with a plurality of threshold values,
specify into which class in a plurality of classes a first block is classified based on the results of comparison of the plurality of evaluation values of the first block and the plurality of threshold values,
derive a first quantization parameter for quantization processing on the first block, based on the specified class, and
determine whether to correct the first quantization parameter based on a magnitude of the derived first quantization parameter, and
wherein in a case:
where the first quantization parameter is determined to be corrected, and
a difference value between the second evaluation value of the first block and the second evaluation value of a second block is higher than a predetermined threshold value, the second block being located spatially adjacent to the first block, then the first quantization parameter is corrected by the controller so that the first quantization parameter becomes smaller.

2. The image encoding apparatus according to claim 1, wherein the controller is configured to determine the quantization parameter on the basis of identification information based on the results of comparison of the plurality of evaluation values with the plurality of threshold values, wherein the identification information indicates any of the plurality of classes, and wherein the controller determines the quantization parameter on the basis of the plurality of classes indicated by the identification information.

3. The image encoding apparatus according to claim 1, further comprising a storage unit configured to store at least one of a motion vector and a prediction error for inter-screen encoding and store at least one of an average value, an activity, a complexity, a distribution for intra-screen encoding.

4. An image encoding method in an image encoding apparatus, the method comprising:

an encoding step of encoding an input image;

a calculating step of calculating a plurality of evaluation values for the block, the plurality of evaluation values including at least a first evaluation value and a second evaluation value, wherein the first evaluation value is an average value of luminance values belonging to the block, and the second evaluation value is one of an activity of the block, a distribution of the block, and a total value of a magnitude of a difference between the luminance values belonging to the block and the average value;

a determining step of determining a quantization parameter for quantization processing on the block in accordance with results of comparison of the plurality of evaluation values including at least the first and second evaluation values calculated by the calculating step with a plurality of threshold values, a specifying step of specifying into which class in a plurality of classes a first block is classified based on the results of comparison of the plurality of evaluation values of the first block and the plurality of threshold values, and a determining step of determining whether to correct the first quantization parameter based on a magnitude of the derived first quantization parameter, and wherein in a case where the first quantization parameter is determined to be corrected, and a difference value between the second evaluation value of the first block and the second evaluation value of a second block is higher than a predetermined threshold value, the second block being located spatially adjacent to the first block, then a correcting step of correcting the first quantization parameter so that the first quantization parameter becomes smaller.

5. A non-transitory computer readable medium comprising instructions for executing an image encoding method, the method comprising:

an encoding step of encoding an input image;

a calculating step of calculating a plurality of evaluation values for the block, the plurality of evaluation values including at least a first evaluation value and a second evaluation value wherein the first evaluation value is an average value of pixel values belonging to the block, and the second evaluation value is one of an activity of the block, a distribution of the block, and a total value of a magnitude of a difference between the luminance values belonging to the block and the average value;

a determining step of determining a quantization parameter for quantization processing on the block in accordance with results of comparison of the plurality of evaluation values including at least the first and second evaluation values calculated by the calculating step with a plurality of threshold values; and a specifying step of specifying into which class in a plurality of classes a first block is classified based on the results of comparison of the plurality of evaluation values of the first block and the plurality of threshold values, and a determining step of determining whether to correct the first quantization parameter based on a magnitude of the derived first quantization parameter, and in a case where:

the first quantization parameter is determined to be corrected, and a difference value between the second evaluation value of the first block, and the second evaluation value of a second block is higher than a predetermined threshold value, the second block being located spatially adjacent to the first block, then a correcting step of correcting the first quantization parameter so that the first quantization parameter becomes smaller.

6. The image encoding apparatus according to claim 1, wherein the controller determines to make the determination of the quantization parameter for quantization processing on the first block in accordance with the evaluation value of the first block and the evaluation value of the second block, in a case where the complexity of the first block is high and the complexity of the second block is low.

7. The image encoding apparatus according to claim 1, wherein the controller derives the first quantization parameter in accordance with the results of comparison of the plurality of evaluation values and the plurality of threshold values of the first block, and in a case where the first quantization parameter is smaller than a predetermined quantization parameter, does not correct the first quantization parameter.

* * * * *